EFFECT OF $B_6Si$ CONCENTRATION ON REACTIVITY AT 700°C.

HEAT TREATMENT TEMPERATURE - °C.

OXIDATION RATES OF SAMPLES CONTAINING
BORON SILICIDES AFTER HEAT TREATMENT
TO VARIOUS TEMPERATURES

○ NO ADDITIVE
△ 0.1 MOLE % $B_4Si$
□ 1.0 MOLE % $B_4Si$
◇ 0.1 MOLE % $B_6Si$

EFFECT OF OXIDATION TEMPERATURE ON
RATE OF OXIDATION
○ 1500° BLANK
□ 2500° BLANK
◇ 1500° 0.1 MOLE% $B_6Si$
△ 2500° 0.1 MOLE% $B_6Si$

INVENTORS
WILLIAM E. PARKER
JOHN F. RAKSZAWSKI
BY
ATTORNEYS

3,261,697
OXIDATION RESISTANT CARBONACEOUS BODIES AND METHOD FOR MAKING

William E. Parker, Lewiston, and John F. Rakszawski, Niagara Falls, N.Y., assignors to Air Reduction Company, Incorporated, a corporation of Delaware
Filed Jan. 16, 1962, Ser. No. 166,563
4 Claims. (Cl. 106—56)

This invention relates to oxidation resistant carbonaceous bodies and to methods for making carbonaceous articles which are resistant to oxidation.

Carbon and graphite articles are widely used as electrodes and in a variety of other high temperature applications. Such high temperature use may be in the atmosphere, or in the presence of other materials which oxidize the carbonaceous material. Various additives, coatings, impregnants, and treatments have been proposed to reduce the burning of carbonaceous materials under high temperature operating conditions. Some of these practices improve the resistance to oxidation of the carbonaceous materials at low and moderate temperatures, but the effectiveness is lost in whole or in part after the materials have been subjected to high temperatures. These prior art procedures increase the cost of the carbonaceous articles and all are of limited effectiveness. The problem of inhibiting oxidation of carbon and graphite articles has remained a serious one.

It is an object of this invention to produce carbon and graphite bodies that exhibit improved oxidation resistance characteristics by reason of containing boron silicides.

Another object of the invention is to produce carbon and graphite bodies that have improved resistance to oxidation by adding boron silicides to the green mix from which the bodies are formed.

The addition of the boron silicides causes the carbon and graphite bodies to be more resistant to oxidation and thereby permits more efficient and economical use in high temperature applications where oxidation normally would be a problem.

It is a further object of this invention to produce carbon and graphite bodies which are resistant to oxidation at high temperatures and which do not lose their oxidation resistance by treatment at high temperatures.

It is also an object of this invention to provide new and improved methods of producing carbon and graphite bodies which have high oxidation resistance.

Other objects and advantages of the invention will become apparent as the description of the invention proceeds.

Figure 1:
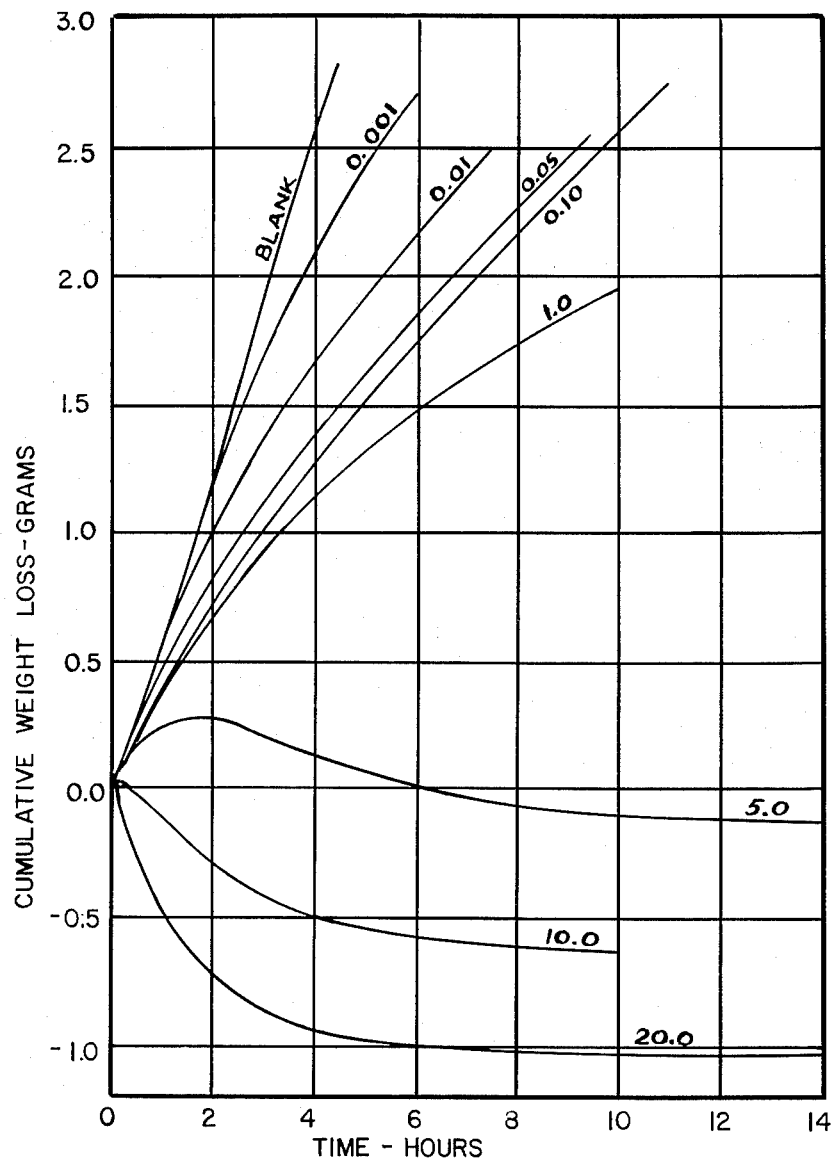
Figure 2:
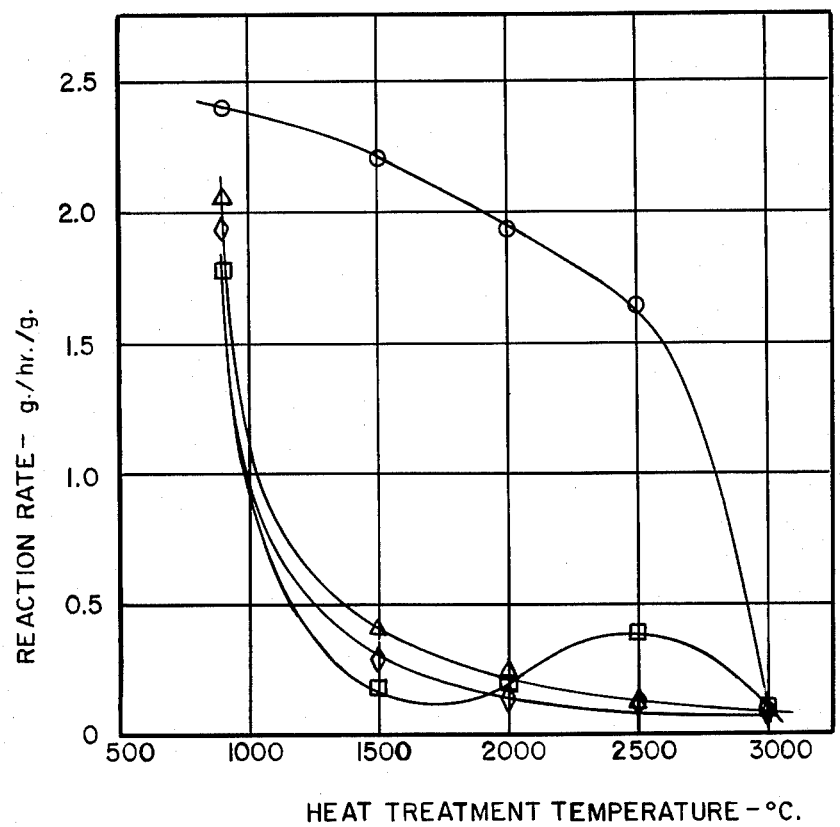
Figure 3:
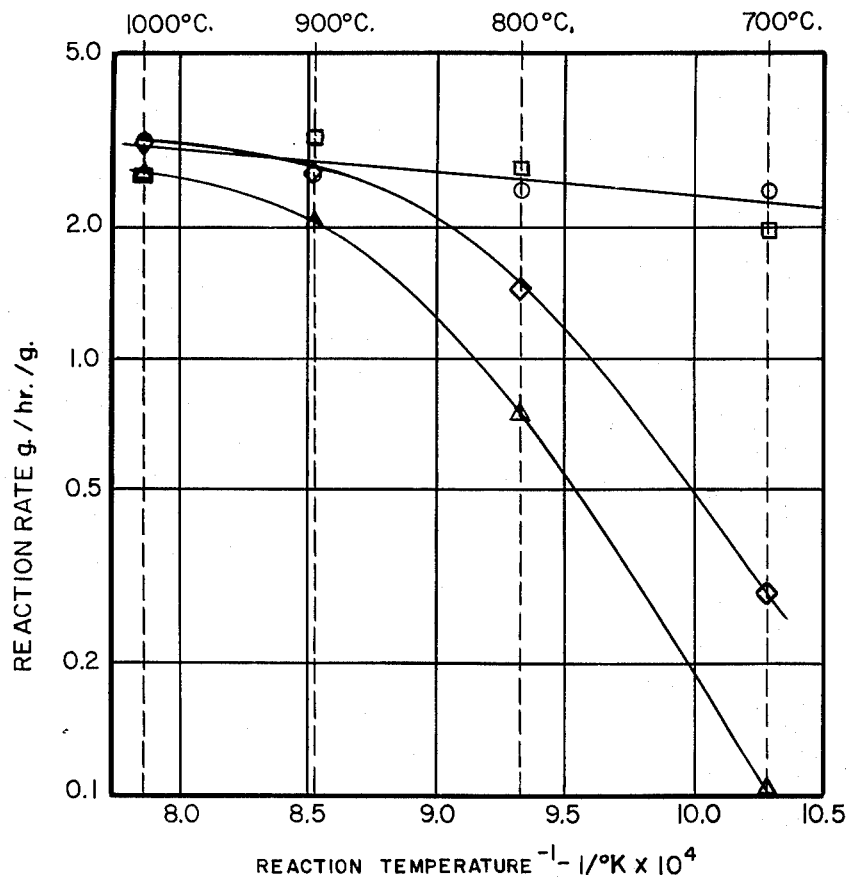

In the drawings, FIGURES 1, 2 and 3 graphically present test data which will be described hereinafter.

Carbon and graphite specimens containing boron silicides were prepared and tested to determine resistance to oxidation in comparison with carbon and graphite specimens containing no boron silicides. Two methods were used to prepare carbon and/or graphite bodies containing boron silicides as oxidation inhibitors.

FIRST METHOD OF PREPARATION

Powdered tetraboron silicide, $B_4Si$, or hexaboron silicide, $B_6Si$, was blended with spectroscopic graphite powder to yield a homogeneous mixture. After blending, the mixture was pelletized at 100,000 p.s.i. and room temperature to form rods ½ inch in diameter by 1¼ inches long. Concurrently, samples were prepared from the pure spectroscopic graphite powder without any additives, so that the effect of the boron silicides on the oxidation of the graphite could be determined by comparison.

Oxidation rates were measured by reacting the samples at 700° C. in a flowing (2500 cc./min.) stream of air. The cumulative weight loss was recorded as a function of time and the oxidation rate in grams per hour per gram was measured. The data for these initial oxidation determinations are shown in Table I.

*Table I.—Oxidation rates of spectroscopic graphite samples containing 0.1 mole percent boron silicide additive*

| Additive | Weight Percent Boron Silicide | Oxidation Rate, g./hr./g. |
|---|---|---|
| None | None | 0.110 |
| $B_4Si$ (−325 mesh) | 0.6 | 0.0485 |
| $B_4Si$ (−325 mesh) [1] | 0.6 | 0.0448 |
| $B_6Si$ (−325 mesh, high purity) | 0.8 | 0.0454 |
| $B_6Si$ (−200 mesh, lower purity) | 0.8 | 0.0459 |

[1] Sample was given a 17 hour preheat at 1,200° C. in helium prior to oxidation.

These data show that when either $B_4Si$ or $B_6Si$ was added to the spectroscopic graphite the oxidation rate was reduced by a factor of about 2. The data from Table I indicates that the purity and particle size of the boron silicides, at least for the conditions measured, are not critical. Preheating in helium for 17 hours at 1200° C. does enhance the oxidation inhibition to some extent. On a mole percent basis, $B_6Si$ is a slightly better oxidation inhibitor, but on a weight percent basis, $B_4Si$ is more effective.

The effect of boron silicide concentration was investigated by oxidizing, at 700° C., samples prepared from spectroscopic graphite and $B_6Si$ (−325 mesh). The preparation of the samples was identical to that described above. The results are shown in Table II and in FIGURE 1.

*Table II.—Effect of boron silicide concentration on initial oxidation of spectroscopic graphite at 700° C.*

| Mole Percent $B_6Si$ | Weight Percent $B_6Si$ | Initial Oxidation Rate, g./hr./g. |
|---|---|---|
| None | None | 0.101 |
| 0.001 | 0.0079 | 0.0895 |
| 0.01 | 0.079 | 0.0815 |
| 0.05 | 0.38 | 0.0675 |
| 0.10 | 0.79 | 0.0645 |
| 1.0 | 7.3 | 0.0538 |
| 5.0 | 29.0 | None |
| 10.0 | 46.3 | None |
| 20.0 | 65.9 | None |

There is a definite increase in oxidation resistance as the concentration of boron silicide is increased. The samples containing 5, 10, and 20 mole percent $B_6Si$ lost weight initially and then gained weight, probably due to the oxidation of $B_6Si$ to $SiO_2$, $B_2O_3$, and/or $nB_2O_3 \cdot mSiO_2$. These oxidation products would protect the graphite from oxidation. In fact, these samples were found to be very hard after oxidizing and when struck sounded like a ceramic.

SECOND METHOD OF PREPARATION

In the second method used to prepare carbon and graphite samples containing boron silicides, conventional carbon (generic) fabricating techniques were used. Four mixes were prepared. Each contained 2465 gms. of 60 x 200 mesh petroleum coke and 740 gms. of −12 mesh coal tar pitch. The amounts of boron silicides used are shown in Table III. Mix No. 1 was used as a control so that the effects of $B_4Si$ and $B_6Si$ could be measured.

Table III.—Concentration data for conventional mixes

| Mix No. | Weight of Boron Silicide | Boron Silicide in Baked Bars | |
|---|---|---|---|
| | | Mole Percent | Weight Percent |
| 1 | None | None | None |
| 2 | 17.3 g. $B_4Si$ | 0.1 | 0.55 |
| 3 | 173 g. $B_4Si$ | 1.0 | 5.5 |
| 4 | 22.6 g. $B_6Si$ | 0.1 | 0.8 |

The following procedure was used in incorporating the additive. The coke and pitch (and boron silicide, when used) were blended together at room temperature and the remainder of the mixing, molding and baking to 900° C. was carried out by conventional techniques.

Further heat treatments of individual bars were made in an induction furnace to temperatures of 1500°, 2000°, 2500°, and 3000° C. in a flowing argon atmosphere. Those carbon bars heated to temperatures in excess of 2200° C. become "graphite" or "graphitized carbon" as is well known in the art and as discussed in the Kirk-Othmer Encyclopedia of Chemical Technology, vol. 3, p. 21, copyright 1949 by The Interscience Encyclopedia, Inc. Oxidation rates were obtained by reacting in air (5000 cc./min.) at 700° C. The experimental results are presented in Table IV and in FIGURE 2. The Mix Nos. in Table IV are the same as in Table III.

Table IV.—Oxidation rates of conventional samples containing boron silicides after heat treatment to various temperatures

| Mix No. | Oxidation Rate, g./hr./g., After Heat Treatment to— | | | | |
|---|---|---|---|---|---|
| | 900° C. | 1,500° C. | 2,000° C. | 2,500° C. | 3,000° C. |
| 1 | 2.40 | 2.21 | 1.93 | 1.64 | 0.110 |
| 2 | 2.06 | 0.404 | 0.234 | 0.121 | 0.0807 |
| 3 | 1.78 | 0.181 | 0.191 | 0.392 | 0.110 |
| 4 | 1.94 | 0.297 | 0.146 | 0.108 | 0.0911 |

Boron silicides have a marked effect on the oxidation rate of graphite, decreasing the rate at all heat treatments. The largest inhibition is observed after heat treatments to temperatures of 1500° to 2500° C. The use of higher concentrations does not appear to enhance the inhibition in this application.

The effect of oxidation temperature was measured by oxidizing, at several temperatures, samples previously heat treated to 1500° and 2500° C. Samples containing 0.1 mole percent $B_6Si$ were compared to blanks containing no boron silicide. The data are shown in Table V and FIGURE 3.

Table V.—Effect of oxidation temperature on rate of oxidation

| Sample | Oxidation Rate, g./hr./g., at Reaction Temperature of— | | | |
|---|---|---|---|---|
| | 700° C. | 800° C. | 900° C. | 1,000° C. |
| 1,500° C. blank | 2.42 | 2.40 | 2.60 | 3.17 |
| 1,500° C. 0.1 mole percent $B_6Si$ | 0.292 | 1.45 | 2.67 | 3.11 |
| 2,500° C. blank | 1.99 | 2.71 | 3.20 | 2.61 |
| 2,500° C. 0.1 mole percent $B_6Si$ | 0.124 | 0.747 | 2.03 | 2.63 |

After heat treating to 1500° C., the inhibition does not occur at reaction temperatures of 900° C. or 1000° C. Heat treatment to 2500° C. extends the inhibiting effect to an oxidation temperature of 900° C.

This invention is of particular significance in that it makes use of compounds to be used as oxidation inhibitors which do not lose their effectiveness after high thermal treatments. In fact, some thermal treatment appears to enhance the inhibiting effect. Because of this, the compounds can be used by simply incorporating them into the green mix followed by conventional processing procedures. No additional treatments are necessary.

The test data demonstrates that the addition of boron silicides produces carbon and graphite articles which exhibit substantially improved resistance to oxidation and which have greater durability under oxidizing conditions than previously known carbon and graphite articles. These desired results are attained without impairment of other properties of the carbon and graphite articles.

What is claimed is:

1. An article made of carbon and having a low rate of oxidation upon exposure to oxidation conditions at temperatures of 700° C. and above, which article consists of graphitized carbon having homogeneously distributed therein 0.001 to 20 mole percent of a boron silicide.

2. The article according to claim 1 in which the boron silicide is from the group consisting of tetraboron silicide and hexaboron silicide.

3. The article according to claim 1 in which the boron silicide is tetraboron silicide.

4. The article according to claim 1 in which the boron silicide is hexaboron silicide.

References Cited by the Examiner

UNITED STATES PATENTS 2,013,625  9/1935  Buck _____ 106—56

FOREIGN PATENTS 456,602  11/1936  Great Britain.

TOBIAS E. LEVOW, *Primary Exaimner.*

JOHN H. MACK, *Examiner.*

J. POER, *Assistant Examiner.*